Figure 1:
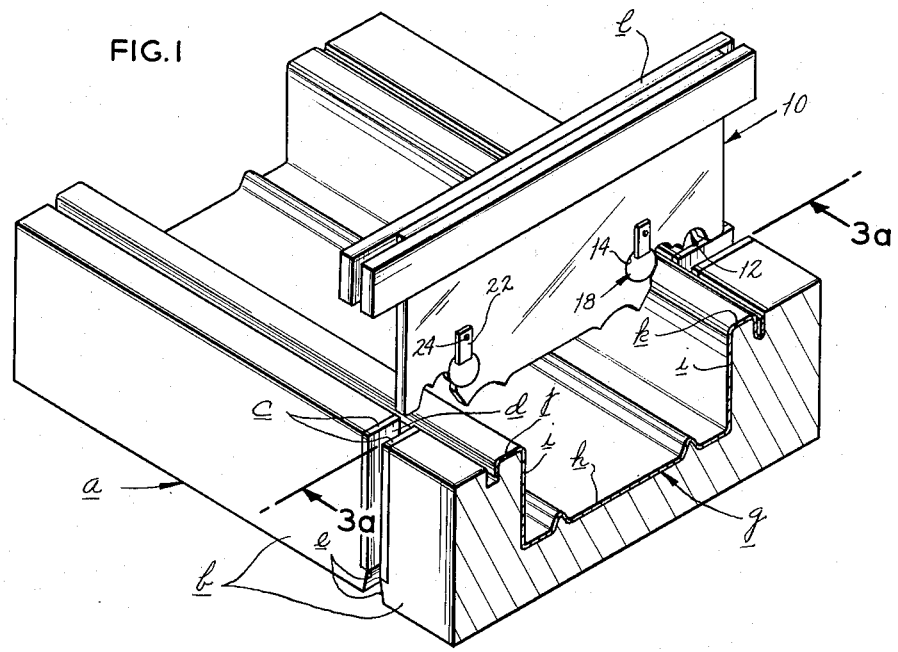

Jan. 4, 1966  C. W. WERNTZ  3,227,026
CUT-OFF PUNCH INCLUDING ROTATABLE DISCS
Filed Jan. 13, 1964  2 Sheets-Sheet 1

INVENTOR
CHARLES W. WERNTZ
BY Jerome A. Grose,
ATTORNEY

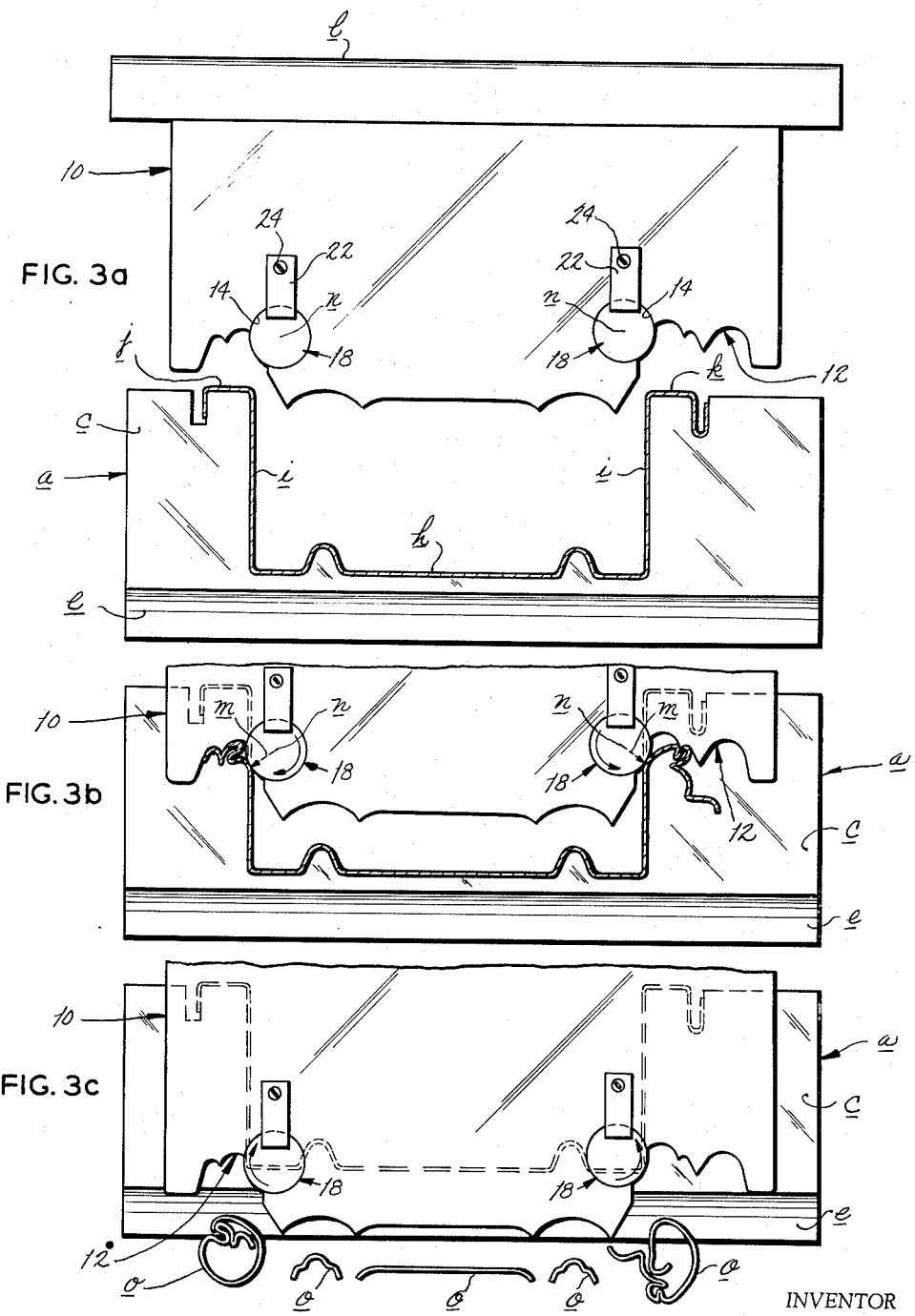

3,227,026
CUT-OFF PUNCH INCLUDING ROTATABLE DISCS

Charles W. Werntz, Ferguson, Mo., assignor to Engel Equipment, Inc., St. Louis, Mo., a corporation of Missouri
Filed Jan. 13, 1964, Ser. No. 337,265
5 Claims. (Cl. 83—685)

The present invention relates generally to an apparatus for cutting longitudinally-formed sheet metal and, more particularly, to a punch blade for cleanly shearing formed sheet metal having wall portions which are substantially deeper in the direction of the cut than the metal thickness. Such wall portions are present in many roll-formed sections, such as continuous longitudinal channels. Upon leaving the roll-forming equipment, the sheet metal channeling is cut into modules of varying lengths by means of a punch and die.

Where the sheet metal channels to be cut have formed wall portions substantially deeper in the direction of the cut than the metal thickness, prior art punches have resulted in generated heat which renders the sheared metal somewhat plastic. This metal, rather than being readily discharged through the die slot, tends to gall and stick to the die, and to impede the punch in its movement through the die slot. Obviously, the deeper the wall portion to be sheared, the more heat generated. The final result of this "sticking" of the sheared material to the die and punch is evidenced by the unevenly cut edges produced in the channeled sheet metal modules. In extreme cases, an uncontrolled tearing of the sheet metal or a jamming up of the punch in the die has been experienced.

The general purpose of this invention is to provide formed sheet metal cutting apparatus which embraces all of the advantages of similarly employed prior art punches and dies and possesses none of the aforedescribed disadvantages. Therefore, the objects of the present invention are to provide: a formed sheet metal punch blade which presents a rotatably changing surface portion to shear wall portions which are substantially deeper in the direction of cut than the metal thickness; a ruggedly constructed cutting apparatus to be used in combination with a die whereby the heat generated in shearing sheet metal wall portions is dissipated continuously during the shearing process; and a formed sheet metal cutting device which makes clean cuts through formed sheet metal channels having wall and flange portions which are substantially deeper in the direction of cut than the metal thickness.

In the present invention these purposes (as well as others apparent herein) are achieved generally by providing a reciprocative punch blade having a punch-out surface, in combination with a die adapted to receive formed sheet metal and contoured to present the formed-up wall portions thereof to the punch blade. The die has a slot in it through which the punch blade is driven and slugs of punched-out metal discharged during the cutting operation. The die is formed so that the wall portions are held to extend nearly vertically, that is, in the direction of travel of the punch blade. The cutting apparatus is characterized by rotatable steel discs having a thickness equal to that of the punch blade and positioned within the blade so as to present a circularly arcuate portion of the periphery of the discs as a continuation of the punch-out surface. On the downstroke of the punch, these circularly arcuate portions traverse the bent-up wall portions of the sheet metal, whereby said rotatable discs present rotatably changing surface portions to shear the sheet metal wall portions so traversed.

Figure 2:
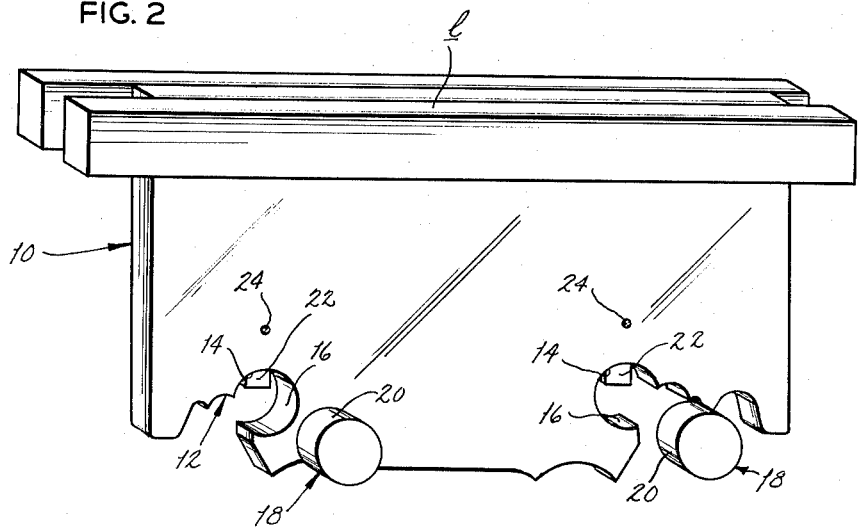

Utilization of the instant invention will become apparent to those skilled in the art from the disclosure made in the following description of the preferred embodiment of the invention, as illustrated in the accompanying drawings, in which:

FIG. 1 is a perspective view of the punch blade of the present invention, the contoured die, and the channeled sheet metal work piece;

FIG. 2 is a perspective view of the punch blade of the present invention with the forward set of retainers removed and the rotatable discs exploded forwardly therefrom; and FIG. 3 is a sequential set of sketches illustrating the relative positions of the punch blade, die, and channeled sheet metal as the punch blade advances from its retracted position of FIG. 3a, proceeds to the intermediate position of FIG. 3b, and reaches its extreme advance position of FIG. 3c.

Referring now to the drawings, wherein like reference characters designate like or corresponding parts throughout the several views, there is shown in FIG. 1 a die, generally designated a, which consists of two spaced apart mild steel mounting blocks b and two hardened steel facing plates c recessed in opposing surfaces of the mounting block b. The mounting blocks b are spaced apart to provide a slot d through which a punch blade, generally designated 10 (to be described hereinafter) is driven during the cutting operation. The lower portion of the opposed surfaces of mounting block b have bevels e which provide adequate clearance for the sheet metal slugs discharged through the slot d. The die a is received and supported on the table of a conventional punch-and-die operative mechanism (not shown), and is contoured to receive the formed channeled sheet metal g presented to the punch blade for cutting.

The sheet metal g is a longitudinally-extending galvanized steel channel which is formed by passing a flat metal sheet through a continuous set of rollers. These rollers fold the sheet into the formed configuration illustrated in FIG. 1 and shown in cross-section in FIG. 3. The formed sheet metal g has a generally horizontally-extending web portion h which joins two vertical flange-like wall portions i. Male and female flange portions j and k, respectively, are provided at the upper ends of the two vertical wall portions i to permit modules of the formed sheet metal g to be interconnected in a construction unit, for example, a roofing unit.

As may be seen from FIGS. 1 and 3, the die a is contoured so as to present the formed-up vertical wall portions i such that they extend substantially in the direction of travel of the punch blade 10. In the absence of the heat generated in the cutting of the vertical wall portions i, the punch blade 10 would pass through the slot d in clean-cutting fashion. However, the depth of the formed sheet metal g, as established by the vertical wall portion i, is substantially greater than the thickness of the sheet metal. In some instances, the depth of the wall portions i may exceed four inches, in which case considerable heat is generated in shearing and punching out the metal slugs.

As may be best seen with reference to FIG. 2, the high impact steel punch blade 10 is a flat plate which is secured to a punch retainer l. This retainer l is adapted to be engaged and driven by the press mechanism (not shown). The punch blade 10 has a contoured punch-out surface 12 which forms its lower edge surface. It is this punch-out surface 12 which passes through the die slot d to puncture and shear those horizontally presented portions of the formed sheet metal g.

In the present invention, the punch blade 10 further has, in its punch-out surface, a pair of circularly arcuate notches 14, each defined by an arcuate edge surface 16. This edge surface 16 serves as a retention and bearing surface for the rotatable means generally designated 18, such as the disc to be described hereinafter. The arc length of the edge surface 16, forming each circularly arcuate notch 14 shown, is greater than 180 degrees. This permits the circularly arcuate notch 14 itself to serve as a retention means for the rotatable discs 18 (or similarly rotatable cutting means) and define their axes of rotation. It further serves to provide bearing surfaces which drive the discs 18 reciprocally with the punch blade 10 and simultaneously guide their rotation about the axis so defined.

Each of the rotatable discs 18 hereinabove referred to is received within the circularly arcuate notch 14 of the punch blade 10; and includes a circularly arcuate periphery portion 20 which is presented as a continuation of the punch-out surface 12 of the blade 10. The disc rotatable means 18 is positioned along the punch-out surface 12 so that, upon actuation of the punch blade 10, it traverses the bent-up wall portion $i$ of the formed sheet metal $g$. In this manner, the rotatable means 18 presents a rotatably changing surface portion to shear the lengthy wall portions $i$ so traversed. Because the rotatable means 18 are free to rotate in their circularly arcuate notches 14, heat generated during the shearing operation is dissipated and carried away by their rotatably changing surface portions 20.

Preferably the rotatable means 18 is a simple hardened steel disc whose thickness equals that of the punch blade 10. The diameter of the steel disc is chosen such that the clearance between its periphery surface portion 20 and the arcuate edge surface 16 of the blade 10 is approximately .0005. When accommodated within the circularly arcuate notch 14, the steel disc 18 has a periphery surface portion 20 which projects outwardly from the punch-out surface 12 of the blade 10. As may be seen best in FIG. 3, this projecting portion is sideward of the axis of rotation $n$ of the disc 18. This positioning causes rotation of the disc 18 as it traverses the wall portions $i$ of formed sheet metal channeling.

Retention tabs 22 are affixed to the forward and aft flat surfaces of the punch blade 10 by means of screws 24, and extend over portions of the disc 18 inwardly of its projection from the punch blade 10. In this manner, the retention tabs 22 restrain the axial movement of the discs 18 from the blade 10 while not interfering with or contacting the formed sheet metal $g$ during the cutting operation. When it is desired to change the steel discs 18, the screws 24 may be loosened and the retention tabs 22 revolved to a position where they do not prevent the axial removal of the discs.

In operation, the punch blade 10 is driven vertically downward by a suitable punch press mechanism (not shown) as illustrated in the sequential sketches of FIGS. 3a–3c. As indicated in FIG. 3b, the steel discs 18 continuously rotate and shear the wall portions $i$ as the punch passes through the die slot $d$. Instead of a single shearing surface which must cut through the entire length of a vertical wall portion $i$, in essence a great many shearing surfaces are successively presented to the wall portions $i$, each cutting through little more than the thickness of the formed sheet metal $g$ in the direction indicated by the dashed arrow $m$ in FIG. 3b. As the punch blade 10 proceeds to the position indicated in FIG. 3c, the metal slugs $o$ which have been sheared from the sheet metal $g$, are discharged through the slug clearance slot formed by the beveled surfaces $e$ in the bottom of the die $a$.

In addition to the dissipation of heat obtained by the unique punch blade disc inserts of the instant invention, the life of the punch blade is enhanced because the steel discs 18 provide in effect a progression or multiplicity of shearing surfaces. Therefore the steel discs 18 tend to become dull at approximately the same rate as the remainder of the punch-off surface 12.

The present cut-off apparatus therefore provides apparatus which will cleanly shear longitudinally formed sheet metal into modular sections and prevent jamming up of the cutting apparatus components during the operation.

Obviously, many modifications and variations of the present invention are possible in light of the above teachings. It is, therefore, to be understood that, within the scope of the appended claims, the invention may be practiced otherwise than is specifically described.

I claim:
1. For cutting longitudinally-formed sheet metal having a formed-up wall portion substantially deeper in the direction of the cut than the metal thickness, cut-off apparatus, comprising
   a reciprocative punch blade having a punch-out surface,
   in combination with
   a die to receive the sheet metal contoured to present the formed-up wall portion to said punch blade, said die having a slot therein through which said punch blade is driven and slugs of punched-out metal discharged, said die presenting the wall portion such that it extends in the direction of travel of said punch blade, and
   characterized by
   rotatable means within said punch blade including a circularly arcuate portion presented as a continuation of the punch-out surface to traverse the bent-up wall portion of the sheet metal,
   whereby said rotatable means presents a rotatably changing surface portion to shear the sheet metal wall portion so traversed.
2. The cut-off apparatus of claim 1, wherein
   the rotatable means is a steel disc whose thickness equals that of the punch blade, and
   said punch blade has in its punch-out surface a circularly arcuate notch within which said disc is accommodated and from which it projects.
3. The cut-off apparatus of claim 2, wherein
   the arc length of said circularly arcuate notch is greater than 180°,
   whereby to so define an axis of rotation of the disc and cause it to travel reciprocally with the punch blade.
4. The cut-off apparatus of claim 3, wherein
   the projection of the disc from the punch-out surface is sideward from the axis of rotation.
5. The cut-off apparatus of claim 4, wherein
   retention tabs are mounted on said punch blade and extend over portions of the disc inwardly of its projection from the punch blade.

No references cited.

WILLIAM W. DYER, Jr., *Primary Examiner.*